United States Patent
Kemmer et al.

[11] Patent Number: 5,927,924
[45] Date of Patent: Jul. 27, 1999

[54] SILO REMOVAL AND DISCHARGE PLATE CONVEYER WITH AUTOMATIC BULK MATERIAL WEIGHING AND METERING ARRANGEMENT

[75] Inventors: Friedrich Kemmer, Ratingen; Hendrik Schnelle, Dormagen; Adolf Ulzhofer, Ratingen, all of Germany

[73] Assignee: Maschinenfabrik Besta GmbH & Co., Ratingen, Germany

[21] Appl. No.: 08/981,994

[22] PCT Filed: Oct. 1, 1996

[86] PCT No.: PCT/DE96/01891

§ 371 Date: Jan. 2, 1998

§ 102(e) Date: Jan. 2, 1998

[87] PCT Pub. No.: WO97/13125

PCT Pub. Date: Apr. 10, 1997

[30] Foreign Application Priority Data

Oct. 3, 1995 [DE] Germany .......................... 195 36 871

[51] Int. Cl.⁶ .................................................. G01G 11/00
[52] U.S. Cl. ............................. 414/21; 177/119; 414/327
[58] Field of Search ..................... 414/21, 327; 198/851, 198/959, 802, 822, 838, 845, 474.1; 177/119, 145

[56] References Cited

U.S. PATENT DOCUMENTS

| | | | |
|---|---|---|---|
| 1,953,388 | 4/1934 | Bettin | 198/851 X |
| 2,758,696 | 8/1956 | Eyler | 198/802 |
| 2,830,803 | 4/1958 | Doyle | 177/16 |
| 2,844,243 | 7/1958 | Christiansen et al. | 198/802 X |
| 3,497,084 | 2/1970 | Murrah | 414/21 |
| 4,114,708 | 9/1978 | Saner | 177/145 |
| 4,420,051 | 12/1983 | Furuta et al. | 198/959 X |
| 4,729,442 | 3/1988 | Sichet | 198/959 X |
| 4,741,431 | 5/1988 | Whitehead | 414/327 X |
| 5,044,819 | 9/1991 | Kilheffer et al. | 198/959 X |
| 5,413,451 | 5/1995 | Pellegrino | 198/851 X |
| 5,547,034 | 8/1996 | Werz et al. | 177/119 X |

FOREIGN PATENT DOCUMENTS

| | | |
|---|---|---|
| 1456699 | 8/1966 | Germany . |
| 3614559 | 4/1986 | Germany . |

*Primary Examiner*—David A. Bucci
*Attorney, Agent, or Firm*—Bauer & Schaffer, LLP

[57] ABSTRACT

The invention relates to a hopper discharging and charging plate conveyor with automatic weighing and apportioning device for bulk materials of all types, there being arranged in the conveying path of the plate conveyor (1) a weighing station (15) which is formed by a weighing bridge which is displaced on load cells (16) or the like and, during conveying operation, determines the bearing weight of the loaded conveying belt by way of repeated measurements. In order to achieve precise weighing results, the horizontal tensile forces of the drawing elements (6), which comprise flat-link chains for example, are isolated from the vertical bearing forces measured at the weighing bridge, this resulting from the fact that the drawing elements (6) are connected to the plate elements (7) of the plate conveyor so as to be freely movable to a limited extent in the vertical direction, and this connection preferably being made via transverse bolts with vertical play in the bolt holes.

10 Claims, 4 Drawing Sheets

SILO REMOVAL AND DISCHARGE PLATE CONVEYER WITH AUTOMATIC BULK MATERIAL WEIGHING AND METERING ARRANGEMENT

TECHNICAL FIELD

The invention relates to a hopper discharging and charging plate conveyor with automatic weighing and apportioning device for bulk materials, the plate elements of the plate conveyor being coupled in a tension-resistant manner to at least one driven, endless drawing element deflected via drive and deflection wheels and, in the conveying, top strand, being supported with rolling action on running rails by means of running rollers arranged on the underside of said plate elements, and there being arranged on the conveying path of the plate conveyor a weighing station, at which the running rails form a weighing bridge which bears on electrical force-measuring devices and, during conveying operation, measures the bearing weight of the loaded plate elements running over it.

PRIOR ART

Hopper discharging conveyors of this type, with the aid of which even those types of bulk materials which are difficult to convey, e.g. tend to stick together, are extracted from hoppers and fed, as far as possible in apportioned quantities, to downstream installations, are known. They are designed such that the plate conveyor extracts the bulk material in a fixed layer height from the hopper and conveys it into the region of the weighing station. The forces arising here from the weight of the plate elements and the bulk material resting thereon are transferred at the weighing station, via running rollers, onto the running rails, which are designed as a weighing bridge and bear on electrical load cells. A tachometer is used to obtain an electrical quantity which is proportional to the speed of the plate conveyor and is multiplied with the weighing results, i.e. with the bearing pressures sensed in the load cells, to give an electrical reproduction of the conveying stream (conveying output) at any one time, the conveying streams at any one time being used to calculate, by electrical integration, the quantity of bulk material conveyed. The electrical quantities are processed by means of an electronic evaluation unit, with the aid of which the bulk materials can thus be apportioned. The weighing bridge essentially comprises two running rail sections which, for example with the aid of links, are displaced in a torque-free manner on electrical load cells which are arranged therebeneath and deliver the weighing result is in the form of electrical quantities. Via the controlled or regulated conveying speeds of the plate conveyer and/or the loading or layer height of the bulk material thereon, it is possible to apportion the bulk material.

The abovementioned hopper discharging plate conveyor has the advantage that, with the integration of the weighing station within the plate conveyor, it is possible to dispense with weighing belts, which are situated downstream of the hopper discharging system, are designed as belt conveyors and work with comparatively high measurement accuracy. However, the weighing accuracy of the plate conveyors equipped with the weighing bridges is beset with sources of error since the horizontal tensile forces of the endless drawing elements of the conveyor, said elements being connected to the plate elements and comprising flat-link chains for example, have a disruptive influence on the vertical forces (bearing weight) which are to be measured at the weighing station. In order to remedy this, it has been common practice to suspend the plate conveyor with its bulk-material charging point in a vertically adjustable manner and to arrange on the suspended formation the load cell which is used for weighing purposes. This arrangement results in increased structural outlay.

DESCRIPTION OF THE INVENTION

The object of the invention is to configure an apparatus of the type mentioned in the introduction with a comparatively low degree of outlay such that the disruptive influences which result from the tensile forces of the driven drawing element or elements (chain belts) and falsify the weighing results can be eliminated and, accordingly, the apparatus can be operated with considerably improved measurement accuracy.

This object is achieved according to the invention in that, in order to isolate the drawing-element tensile forces from the bearing forces measured at the weighing bridge, the drawing element or elements is or are connected to the plate elements so as to be freely movable to a limited extent in the vertical direction.

According to the invention, the different horizontal forces resulting from the drive forces of the endless drawing element or elements (chain belts) are thus isolated from the vertical forces which are to be measured at the weighing station and correspond to the mass which is to be weighed, with the result that, as far as the weighing result is concerned, the disruptive influence of these horizontal forces is eliminated. It is thus possible, when using the weighing station integrated in the plate conveyor and formed by the weighing bridge, to work with considerably improved measurement accuracy, with the result that it is possible to work with correspondingly high apportioning accuracy during bulk-material discharge and bulk-material transfer.

Specifically, the arrangement may advantageously be such that the plate elements of the plate conveyor are coupled to the drawing element or elements by means of transverse bolts which pass with the vertical play necessary for isolation purposes through bolt holes in coupling parts which are connected fixedly to the plate elements. The bolt holes of the coupling parts may be designed as vertical slots with planar lateral bounding surfaces and, in the region where they pass through the bolt holes, the transverse bolts are provided with correspondingly planar lateral guide surfaces. For the endless drawing elements, use may be made, as usual, of flat-link chains, the abovementioned transverse bolts expediently being arranged on the flat-link articulations, that is to say simultaneously forming the articulation bolts of the flat-link articulations. It is also recommended that the flat-link chains, which are mounted with the plate elements so as to float in the vertical direction, be equipped with bearing rollers which run on guide tracks and, nevertheless, serve only for the rolling guidance of the flat-link chains, but not for supporting the bearing weight of the plate conveyor. This is set down alone by the running rollers which are mounted in roller-retaining means on the underside of the plate elements and run on the running rails.

In addition, the arrangement is expediently such that the bulk-material charging point arranged at the hopper outlet, above the plate conveyor, is, as known, designed as a bulk-material charging point which charges the plate conveyor with a predetermined layer height of the bulk material.

The invention is explained in more detail herein-below in conjunction with the exemplary embodiment shown in the drawing, in which:

BEST METHODS OF IMPLEMENTING THE INVENTION

The basic structure of the illustrated hopper discharging and charging plate conveyor with automatic weighing and apportioning device for bulk material of various types is known.

Figure 1:
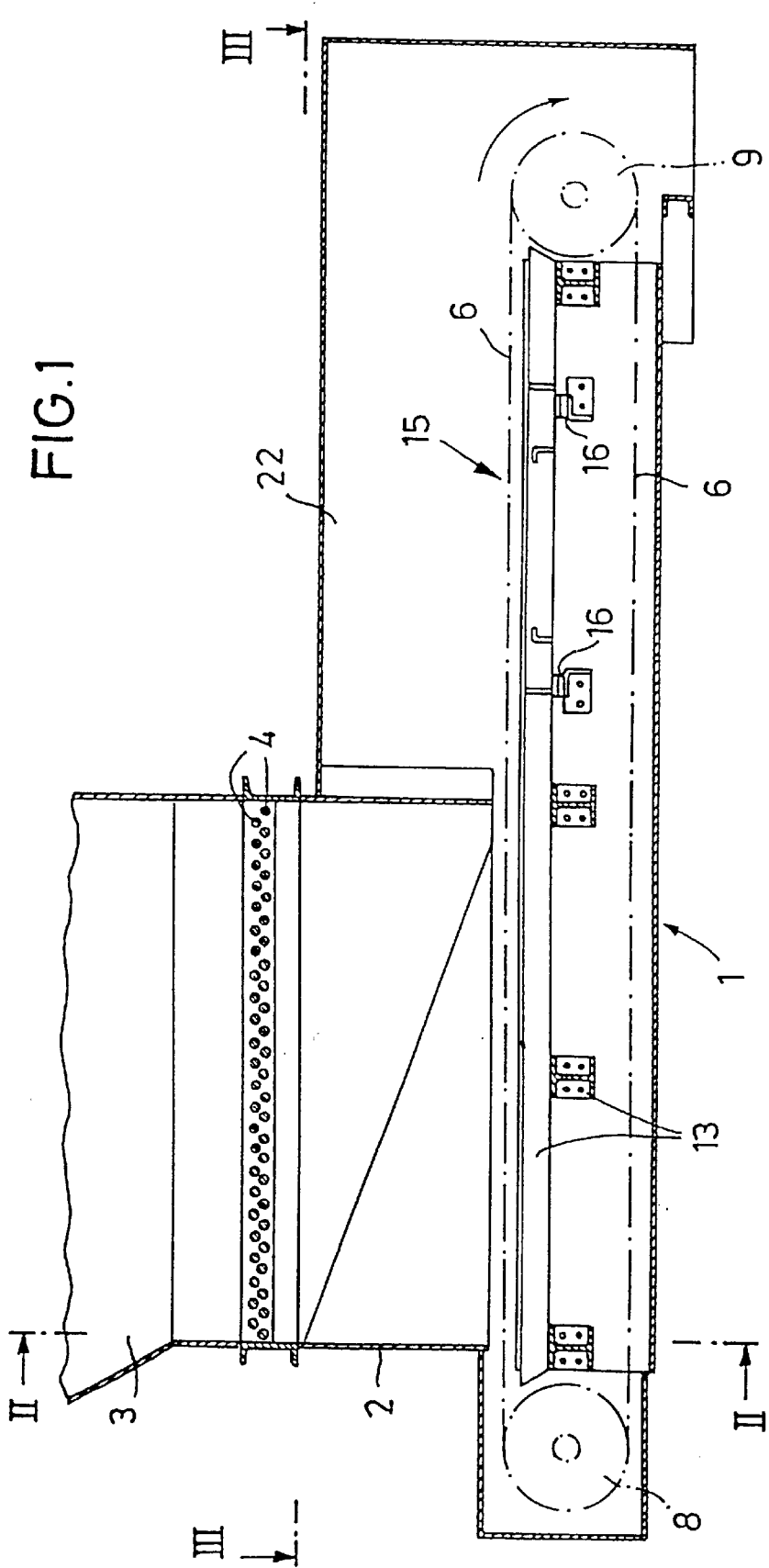
FIG. 1 shows a longitudinal section of an inventive hopper discharging and charging plate conveyor with associated weighing station.
Figure 2:
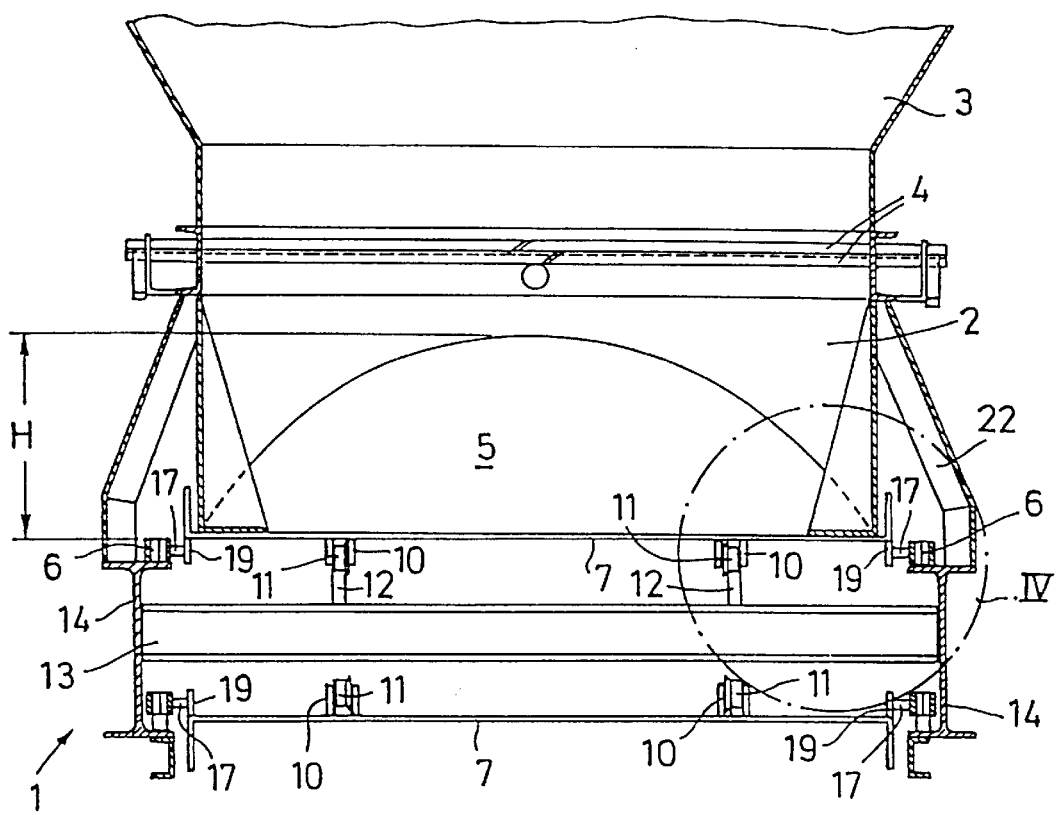
FIG. 2 shows a vertical section along line II—II of FIG. 1.
Figure 3:
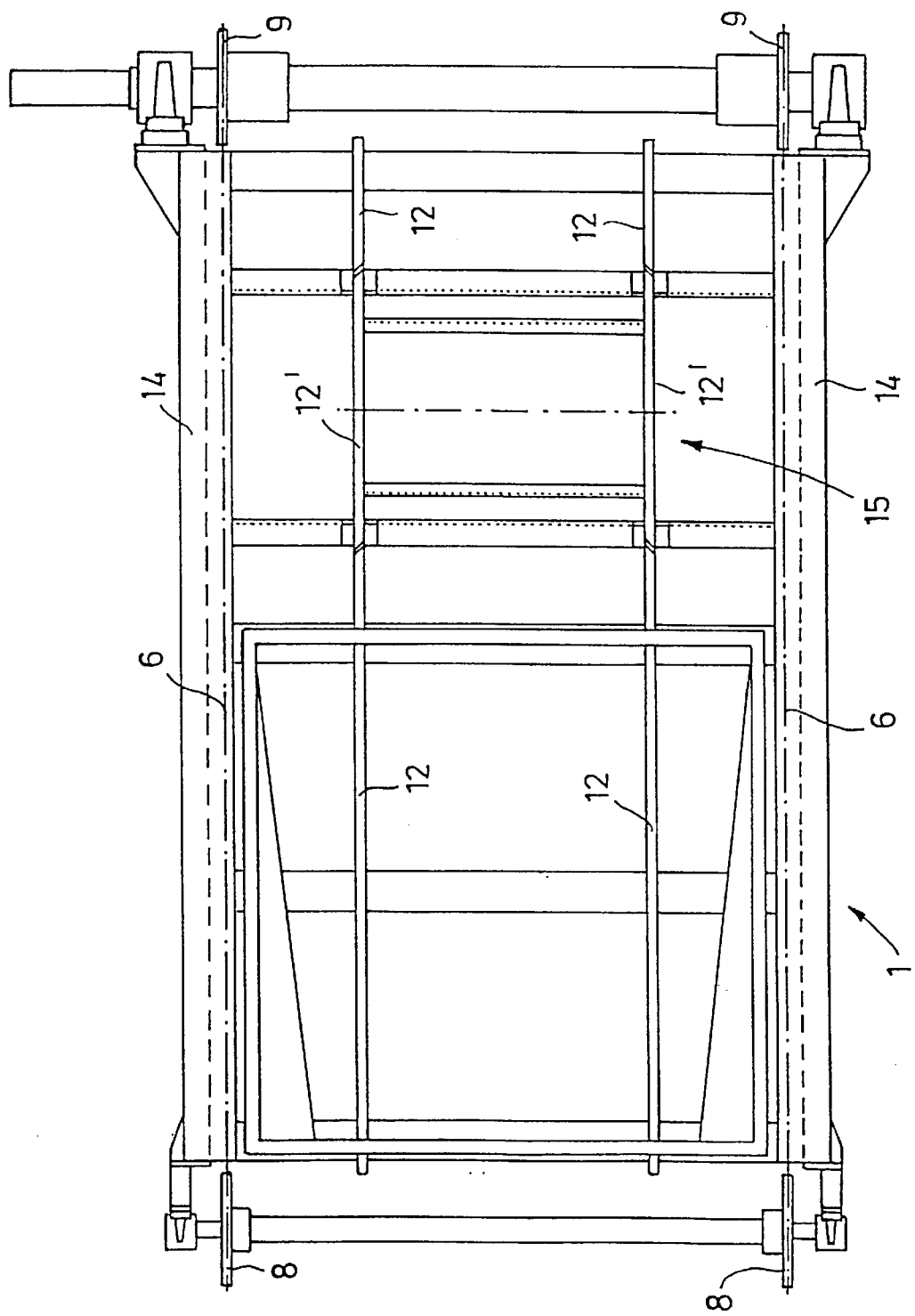
FIG. 3 shows a horizontal section along line III—III of FIG. 1, although, in order to illustrate the weighing station, the plate conveyor and the outer panelling have been omitted.

The plate conveyor 1 is arranged with its charging end beneath the hopper outlet 2 of a bulk-material hopper 3, of which only the outlet region is shown here, and a shut-off slide 4 is, as usual, located at the hopper outlet. The hopper outlet 2 is, as known, designed such that, when the shut-off slide 4 is open, the conveying, top strand of the plate conveyor 1 is charged with a predetermined layer height, which is designated by the dimension H in FIG. 2, of the bulk material running out of the hopper. According to FIG. 2, the bulk-material charging point arranged at the hopper outlet 2, above the plate conveyor, is designed such that, as is shown at 5 in FIG. 2, the plate conveyor is charged with a rounded bulk-material pile of predetermined height H. The plate conveyor has two parallel, endless drawing elements in the form of flat-link chains 6 which are connected in a tension-resistant manner to the individual plate elements 7 of the plate conveyor in order to carrot the bulk-material pile along and which, at the ends of the conveyor, are driven and deflected via drive and deflections wheels 8 and 9, expediently at a conveying speed which can be regulated. On their side directed away from the bulk-material transporting side, the plate elements 7, which form the endless plate conveyor, have running rollers 11 which are mounted in roller-retaining means 10 and by means of which the conveying, top strand of the plate conveyor is guided and supported with rolling action on two mutually parallel running rails 12. The running rails 12 are arranged, at a lateral distance from one another which is smaller than the width of plate elements 7, on the fixed frame 13 of the conveyor, which, on its two sides, has lateral boundaries 14 which are designed in this case as I-supports and in the region of which the two flat-link chains 12 run.

Located downstream of the hopper outlet 2 in the conveying direction, that is to say between this outlet and the deflection wheels 9 which form the offloading end of the plate conveyor, is a weighing station 15 designed as a so-called weighing bridge. This comprises two running-rail sections 12' which are each arranged in a vertically movable manner between the fixedly arranged running rails 12 and may be connected to one another via a transverse connection in order to form the weighing bridge. On each of its two running-rail sections 12', which are aligned with the fixed running rails 12, the weighing bridge is supported on electrical force-measuring devices 16, which are arranged on the conveying frame, beneath the conveying, top strand of the plate conveyor, and comprise electrical load cells or the like. During the conveying operation of the plate conveyor 1, these load cells measure the bearing weight of the plate conveyor, loaded with bulk material, running over the weighing bridge. The measured values which are thus determined at any one time are fed, as electrical quantities, to an electronic evaluation unit (not illustrated) which is a constituent part of the weighing and apportioning device and uses the measured electrical quantities of the weighing measurements, and the measured quantities which are likewise fed to it and represent the conveying speed of the plate conveyor, to effect apportioning of the bulk material, as is known per se.

The tensile forces in the driven flat-link chains 6 can have a disruptive effect on the weighing operation at the weighing station 15. In order to eliminate these disruptive influences and to be able to work with higher measurement accuracy, the flat-link chains 6 are connected to the plate elements 7 of the plate conveyor so as to be freely movable to a limited extent in the vertical direction, with the result that it is possible to isolate the tensile forces of the flat-link chains from the bearing forces measured at the weighing bridge. In the exemplary embodiment shown, this isolation is brought about, and is illustrated in particular in the FIGS. 4 and 5, in that the plate elements 7 of the plate conveyor are coupled to the flat-link chains 6 by transverse bolts 17, the transverse bolts 17 passing with vertical play which is sufficient for the isolation through bolt holes 18 in the coupling parts 19 which are fixedly connected to the underside of the plate elements 7. In the exemplary embodiment shown, the coupling parts 19 are designed as coupling plates. As can be seen from FIG. 5 in particular, the bolt holes 18 are designed as vertical slots with mutually parallel, planar vertical side surfaces and, in the region where they pass through the bolt holes, the transverse bolts 17 are provided with correspondingly planar lateral guide surfaces, with the result that the transverse bolts 17 are guided in the bolt holes 18 with the predetermined vertical play X (FIG. 5). Of course, the running rollers 11 are mounted on the roller-retaining means 10 in a virtually play-free manner, while the vertical play X provided for the purpose of isolating the horizontal and vertical forces is dimensioned such that, when the loaded plate conveyor passes through the weighing station 15, the tensile forces in the flat-link chains 6 cannot influence the weighing results. The transverse bolts 17 are arranged on the flat-link articulations of the flat-link chains 6, i.e. they simultaneously form the articulations of the flat-link chains here.

Figure 4:
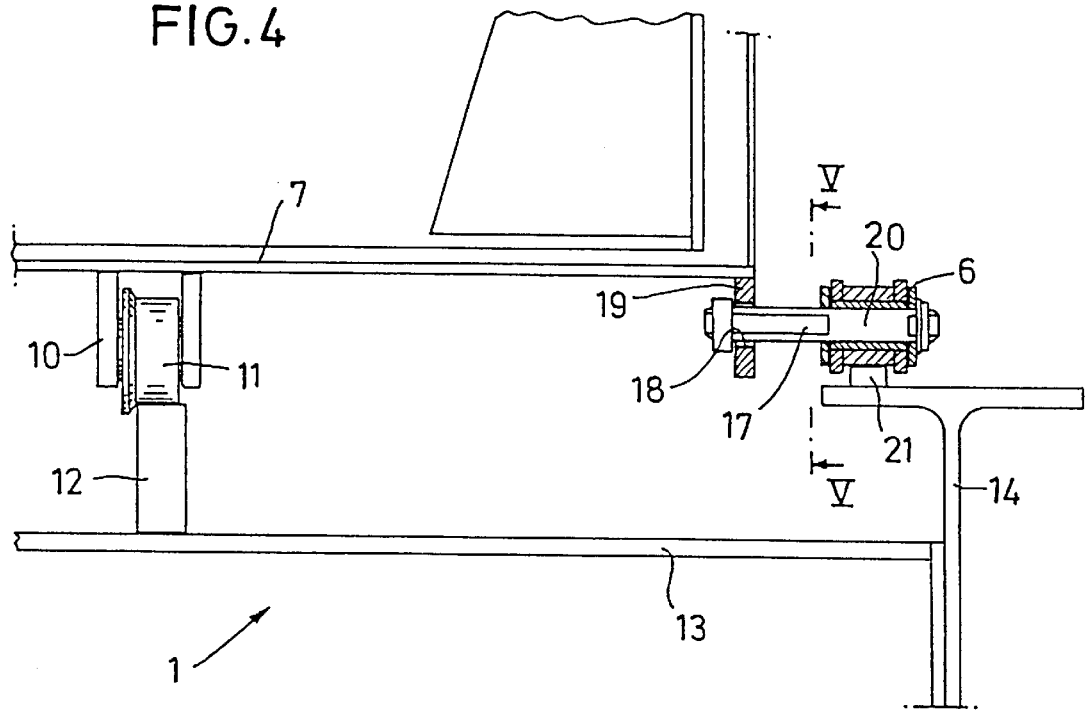
FIG. 4 shows, on an enlarged scale, that detail of the plate conveyor which is designated by IV in FIG. 2.
Figure 5:
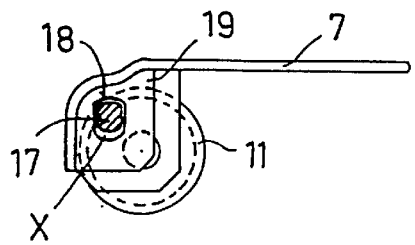
FIG. 5 shows a section along line V—V of FIG. 4.

As FIG. 4 shows in particular, the flat-link chains 6 which are mounted with the plate elements 7 so as to float in the vertical direction with verctical play are equipped with bearing rollers 20 which roll on guide tracks. The latter comprise narrow guide strips 21 which are arranged on the side boundaries 14, i.e. on the horizontal top and bottom flanges of the I-profiles which form the side boundaries. These bearing rollers 20 merely serve for chain guidance in the top and bottom strands of the plate conveyor; on account of the vertical play X, they do not transfer the bearing weight of the plate conveyor.

The abovedescribed connection of the plate elements 7 to the drawing elements or flat-link chains 6 with the vertical play X via the transverse bolts 17 results in the horizontal tensile forces of the drawing elements and the vertical forces which are to be measured at the weighing station 15 (bearing weight of the loaded plate conveyor) being isolated in a manner which is particularly straightforward in structural terms. It goes without saying, however, that this isolation can also be achieved by another type of vertically floating connection of the plate elements to the drawing elements or the flat-link chains 6. The entire plate conveyor 1, which may be provided with a panelling 22, is mounted in a fixed and stationary manner beneath the hopper 3 and its hopper outlet 2. The abovedescribed arrangement thus provides the plate conveyor with an automatic weighing and apportioning device, in particular also for sluggishly flowing bulk materials, by means of which the bearing forces sensed by the force-measuring device 16 i.e. the vertical forces of the respective bulk-material and plate-conveyor weight, can be measured very precisely without disruptive influences from the tensile forces of the flat-link chains and can be evaluated for the purpose of apportioning the bulk material. Of course, the plate elements 7 of the plate conveyor may be designed with lateral bounding surfaces in order to avoid the bulk material running off from the sides of the plate conveyor. At the same time, the plate conveyor 1 forms a charging plate conveyor which feeds the bulk material to a downstream unit or the like in apportioned quantities.

We claim:

1. A hopper discharging and charging plate conveyor with automatic weighing and apportioning device for bulk materials, said plate conveyor having a conveyor path and plate elements with an underside, said plate elements having a conveying top strand which when loaded with the bulk materials forms loaded plate elements with a bearing weight creating bearing forces, said plate elements being coupled in a tension-resistant manner to at least one driven, endless drawing element having drawing-element tensile forces and being deflected via drive and deflection wheels, and said conveying top strand, being supported with rolling action on running rails by running rollers arranged on said underside of said plate elements, and there being arranged on said conveying path of said plate conveyor a weighing station, at which said running rails form a weighing bridge which bears on electrical force-measuring devices, and during conveying operations, measures said bearing weight of said loaded plate elements running over it, characterized in that, in order to isolate said drawing-element tensile forces from said bearing forces measured at said weighing bridge, said at least one driven, endless drawing element is connected to said plate elements so as to be freely movable to a limited extent in a vertical direction.

2. The hopper discharging and charging plate conveyor according to claim 1, characterized in that said plate elements are coupled to said at least one driven, endless drawing element by transverse bolts which pass with vertical play through bolt holes in coupling parts which are connected fixedly to said plate elements.

3. The hopper discharging and charging plate conveyor according to claim 2, characterized in that said bolt holes in said coupling parts are designed as vertical slots with planar lateral bounding surfaces, and in a region where they pass through said bolt holes, said transverse bolts are provided with correspondingly planar lateral guide surfaces.

4. The hopper discharging and charging plate conveyor according to claims 2 or 3, characterized in that said at least one driven, endless drawing element is a pair of driven, endless drawing elements that are mutually parallel and comprise flat-link chains, said transverse bolts being arranged on said flat-link chains.

5. The hopper discharging and charging plate conveyor according to claim 4, characterized in that said flat-link chains, which are mounted with said plate elements so as to float in the vertical direction, are equipped with bearing rollers which run on guide tracks.

6. The hopper discharging and charging plate conveyor according to claim 1, characterized in that a bulk-material charging point is arranged at a hopper outlet, above said plate conveyor, which charges said plate conveyor with a predetermined layer height of the bulk materials.

7. The hopper discharging and charging plate conveyor according to claim 2, characterized in that a bulk-material charging point is arranged at a hopper outlet, above said plate conveyor, which charges said plate conveyor with a predetermined layer height of the bulk materials.

8. The hopper discharging and charging plate conveyor according to claim 3, characterized in that a bulk-material charging point is arranged at a hopper outlet, above said plate conveyor, which charges said plate conveyor with a predetermined layer height of the bulk materials.

9. The hopper discharging and charging plate conveyor according to claim 4, characterized in that a bulk-material charging point is arranged at a hopper outlet, above said plate conveyor, which charges said plate conveyor with a predetermined layer height of the bulk materials.

10. The hopper discharging and charging plate conveyor according to claim 5, characterized in that a bulk-material charging point is arranged at a hopper outlet, above said plate conveyor, which charges said plate conveyor with a predetermined layer height of the bulk materials.

* * * * *